E. L. REYNOLDS.
LIQUID METER.
APPLICATION FILED DEC. 27, 1913.
1,125,176.
Patented Jan. 19, 1915.
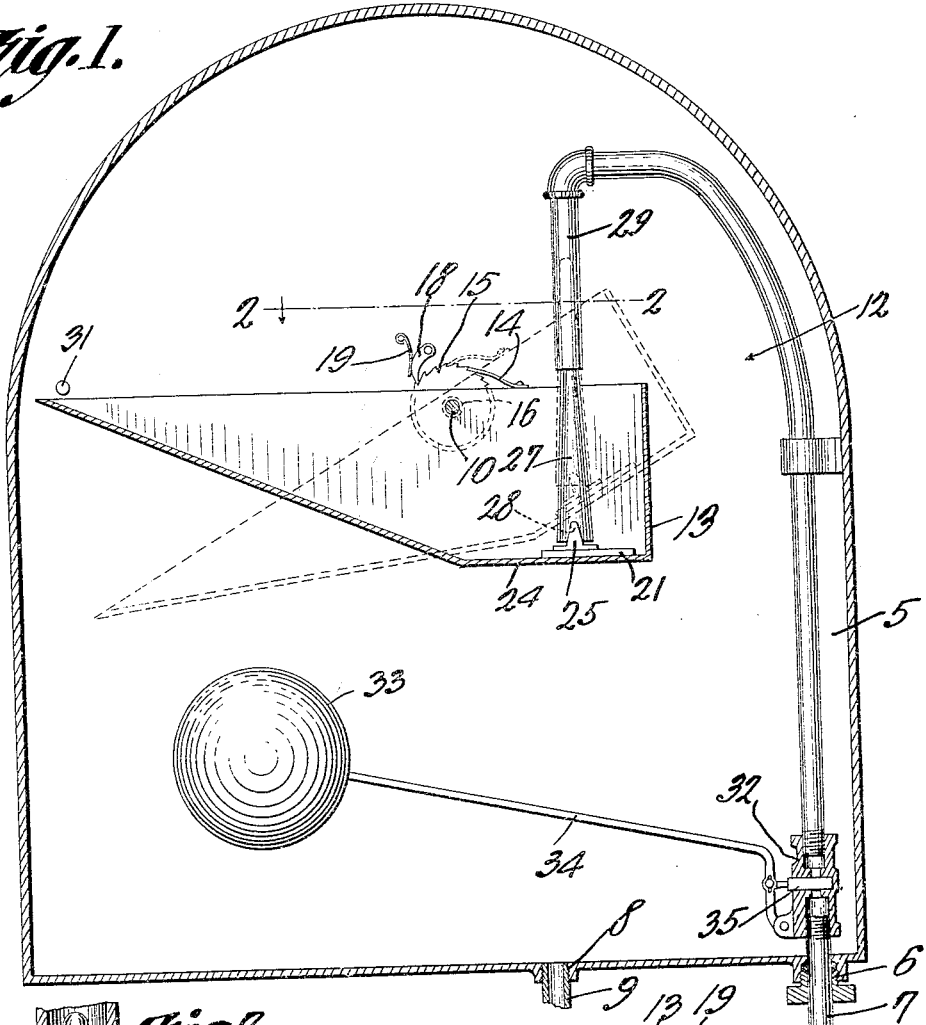
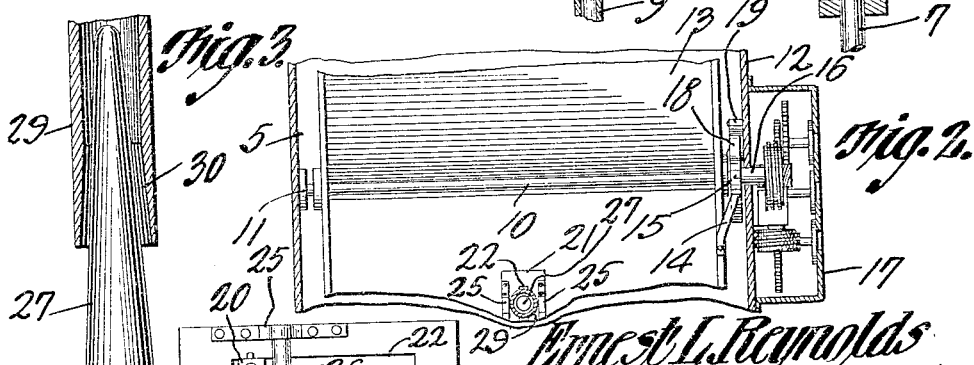
Ernest L. Reynolds, Inventor
by C. A. Snow & Co., Attorneys

UNITED STATES PATENT OFFICE.

ERNEST L. REYNOLDS, OF ARDMORE, OKLAHOMA.

LIQUID-METER.

1,125,176.  Specification of Letters Patent.  Patented Jan. 19, 1915.

Application filed December 27, 1913.  Serial No. 809,018.

*To all whom it may concern:*

Be it known that I, ERNEST L. REYNOLDS, a citizen of the United States, residing at Ardmore, in the county of Carter and State of Oklahoma, have invented a new and useful Liquid-Meter, of which the following is a specification.

This invention relates to improvements in liquid meters.

An object of the present invention is to provide a meter for liquids which are used in exceedingly small quantities.

A further object is to provide a liquid meter including a measuring tray which when it becomes full, automatically tilts to discharge the liquid therefrom and when so doing the supply of liquid will be closed.

A further object is to provide a meter especially adapted for the measuring of oil which is used in small quantities such as for oil stoves, etc., the meter accurately measuring an exceedingly small rate of flow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a view in vertical section of my improved meter. Fig. 2 is a view in horizontal section of a fragmentary portion thereof, taken on the line 2—2 of Fig. 1. Fig. 3 is a detail view with parts broken away of the auxiliary valve. Fig. 4 is a detail view in plan of the sliding plate portion of the said valve mechanism.

Referring to the drawings in which similar reference numerals designate corresponding parts throughout the several views, a tank 5 is provided with an inlet opening 6 through which extends the supply pipe 7 and a second opening 8 communicating with which is the delivery pipe 9. The liquid which is to be measured is introduced through the pipe 7 and discharged through the pipe 9. The meter has been designed primarily for measuring oil, which is used at an exceedingly slow rate by oil or cook stoves, although it is to be understood in this connection that other liquids besides oil may be successfully measured by my improved form of meter.

A shaft 10 extends across the tank and is revolubly supported in one wall by the bearing 11 and is supported at its remote extremity by passing through the side wall 12 of the tank. Hingedly secured to and supported by the shaft 10 is the vessel 13, which is known as a tilting vessel, due to the fact that when the vessel is empty the center of gravity will fall upon one side of its pivotal support, while, when the vessel becomes filled with liquid the center of gravity shifts to the opposite side of the shaft and due to the manner in which the vessel is supported, the vessel is accordingly tilted and discharges the liquid therefrom, after which it returns to its original position. The shaft 10 which is rigidly secured to and actuated by the dumping pan 13 is provided with a pawl 14 which engages the ratchet wheel 15 and imparts intermittent uni-directional rotation thereto. The ratchet wheel 15 is carried by a sleeve 16 which encompasses the shaft 10 and although being held against shifting with respect thereto, can rotate independently thereof. A registering mechanism 17 is mechanically connected to and driven by the sleeve 16 and includes the usual allotment of gears and dials whereby the number of times the pan or vessel 13 dumps will be registered.

In order to prevent the return movement of the pan from dragging the ratchet wheel around therewith, a suitable locking pawl 18 is provided and is held in contact with the ratchet wheel by a suitable spring 19, thus positively limiting the said ratchet wheel to uni-directional rotation, *i. e.* a rotation imparted thereto by the pan during the act of tilting. Rigidly secured to the bottom wall of the pan or vessel 13 is the polygonal lug 20 which holds and guides for rectilinear motion a plate 21. This plate is provided with the slot 22 which receives the lug 20 therein and which lug is provided with the overhanging ears 23 which extend over the side walls of the slot and prevent the plate from rising above and becoming disengaged from the lug. The plate 21 as illustrated in Fig. 2, rests upon the bottom 24 of the pan and due to the lug and the slot 22 is held in contact therewith, and mounted for rectilinear motion in a plane which extends at right angles to the shaft 10. Thus as the pan dumps, the plate may be held against horizontal movement while being raised or lowered by the pan or vessel. The sliding plate 21 is provided with the upstanding brackets 25 between which extends the pin 26. A valve 27 is provided with a suitable aperture 28 through which extends the pin 26 of the pivotal mounting of the valve. An overhanging supply pipe 29 is provided with the valve seat 30 therein, into which extends the valve member 27. The valve member 27 at all times extends within the valve seat but does not effect a sealed joint therewith when the pan is located in its normal position as illustrated in Fig. 1. However, when the pan becomes filled with liquid and rotates about the shaft 10 into the dotted position as illustrated in Fig. 1, the valve member will be raised, traveling in a vertical line, due to the mounting of the sliding plate and will contact with the valve seat and prevent any further supply of liquid to the pan while in a tilted position. The valve member seat also affords a check to prevent excessive tilting of the pan. In this connection it might be stated that a suitable stop 31 is fastened to the tank and arranged in the path of movement of the pan and so arranged as to hold the same in a horizontal position after the pan has tilted and discharged the liquid contents thereof.

The pipe 29 communicates with the supply pipe 7, in which pipe is arranged the automatic valve 32. The automatic valve 32 is adapted to control the level of the liquid within the tank and includes a float 33, an arm 34, and a gate valve member 35. Thus when the liquid within the tank rises above a predetermined level, the float will, through the intervention of the arm 34, move the gate valve member 35 inward and close the valve to prevent the further supply of liquid to the pan 13. The liquid after the volume has been duly measured and registered passes from the meter through the outlet or discharge pipe 9. The meter may be used for the measuring of liquid with a low rate of flow and accurately measures the same due to the fact that at the time of dumping of the pan 13, which holds a known quantity of liquid, the auxiliary valve including the member 27 and seat 30, will automatically close so as to prevent the supplying of liquid to the pan while in a tilted position, which liquid would be immediately discharged from the pan without being first properly registered. The automatic level controlling valve 32 prevents the liquid in the meter from rising to such level as would interfere with the workings of the measuring pan.

Having thus fully described my invention, what I claim is:—

1. A meter comprising a dumping pan, a valve member slidably carried by said pan, a supply pipe extending above said pan, said supply pipe provided with a valve seat coacting with said valve member the latter being adapted to close said liquid supply pipe during the tilted position of said pan.

2. A meter comprising a tank, a dumping pan disposed therein, a supply pipe extending above said pan, a valve seat within said supply pipe, a valve member carried by said pan and extending within said valve seat and adapted to close said liquid supply pipe during the tilted position of said pan, and registering mechanism connected to and actuated by the tilting of said pan.

3. A meter including a tank, a supply pipe leading therein, a dumping pan located within said tank, registering mechanism connected to and actuated by said pan, said supply pipe extending above and being adapted to supply liquid to said pan, means for limiting the tilting movement of said pan in one direction, a valve member slidably carried by said pan and extending within said supply pipe, said supply pipe being provided with a valve seat coacting with said valve member and adapted to close said liquid supply pipe during the tilted position of said pan, and an automatic valve located within said supply pipe controlling the level of liquid within said tank, and means for discharging the liquid from said tank.

4. A meter including a tank with inlet and outlet openings, a dumping pan rotatably mounted within said tank, registering mechanism connected to said pan and registering the movements thereof, means communicating with said inlet opening and adapted to supply liquid to said pan, said means including a valve seat disposed above said pan, a sliding plate mounted upon said pan, means carried by the pan controlling the movements of said sliding plate, a valve member pivotally secured to said sliding plate and extending within said valve seat, said valve member being adapted to close said valve seat during the tilted position of said pan, means for limiting the tilting movement of said pan in both directions, and means disposed within said liquid supplying means preventing the rising of the liquid within the tank to abnormal levels.

In testimony that I claim the foregoing as my own, I have hereto affixed my signature in the presence of two witnesses.

ERNEST L. REYNOLDS.

Witnesses:
E. C. WYMORE,
MAX WYMORE.

Copies of this patent may be obtained for five cents each, by addressing the "Commissioner of Patents, Washington, D. C."